United States Patent
Slavens et al.

(10) Patent No.: US 10,487,667 B2
(45) Date of Patent: Nov. 26, 2019

(54) AIRFOIL, AND METHOD FOR MANUFACTURING THE SAME

(71) Applicant: United Technologies Corporation, Hartford, CT (US)

(72) Inventors: Thomas N. Slavens, Vernon, CT (US); Sergey Mironets, Charlotte, NC (US); Alexander Staroselsky, Avon, CT (US); Brooks E. Snyder, Glastonbury, CT (US); Thomas J. Martin, East Hampton, CT (US)

(73) Assignee: United Technologies Corporation, Farmington, CT (US)

( * ) Notice: Subject to any disclaimer, the term of this patent is extended or adjusted under 35 U.S.C. 154(b) by 319 days.

(21) Appl. No.: 14/901,910

(22) PCT Filed: Jul. 1, 2014

(86) PCT No.: PCT/US2014/045095
§ 371 (c)(1),
(2) Date: Dec. 29, 2015

(87) PCT Pub. No.: WO2015/002976
PCT Pub. Date: Jan. 8, 2015

(65) Prior Publication Data
US 2016/0369634 A1  Dec. 22, 2016

Related U.S. Application Data

(60) Provisional application No. 61/841,697, filed on Jul. 1, 2013, provisional application No. 61/991,224, filed on May 9, 2014.

(51) Int. Cl.
*B23P 15/04* (2006.01)
*F01D 5/14* (2006.01)
(Continued)

(52) U.S. Cl.
CPC .............. *F01D 5/187* (2013.01); *B23P 15/04* (2013.01); *F01D 5/147* (2013.01); *F01D 5/28* (2013.01);
(Continued)

(58) Field of Classification Search
CPC .......... F01D 5/187; F01D 5/188; F01D 5/189; F01D 5/28; F01D 5/284; B23P 15/04; F05D 2260/201; F05D 2260/202; F04D 29/324
See application file for complete search history.

(56) References Cited

U.S. PATENT DOCUMENTS 5,120,192 A * 6/1992 Ohtomo ................. F01D 5/189
                                                        415/115
5,683,825 A * 11/1997 Bruce ..................... C23C 28/00
                                                        427/248.1
(Continued)

OTHER PUBLICATIONS

EP office action for EP14820101.5 dated Jun. 23, 2017.
EP search report for EP14820101 dated Jun. 10, 2016.

*Primary Examiner* — Woody A Lee, Jr.
*Assistant Examiner* — Christopher R Legendre
(74) *Attorney, Agent, or Firm* — O'Shea Getz P.C.

(57) ABSTRACT

A component for use in a gas turbine engine includes a first section, a second section, and a functionally graded section. The first section is made of a metal material. The second section is made of a ceramic material and/or a ceramic matrix composite material. The functionally graded section is disposed between the first section and the second section.

25 Claims, 4 Drawing Sheets

(51) Int. Cl.

| | | |
|---|---|---|
| *F01D 5/18* | (2006.01) | |
| *F01D 5/28* | (2006.01) | |
| *F01D 9/04* | (2006.01) | |
| *F01D 25/12* | (2006.01) | |
| *F04D 29/32* | (2006.01) | |
| *F04D 29/54* | (2006.01) | |
| *F04D 29/58* | (2006.01) | |

(52) U.S. Cl.
CPC .............. *F01D 5/284* (2013.01); *F01D 9/041* (2013.01); *F01D 25/12* (2013.01); *F04D 29/321* (2013.01); *F04D 29/325* (2013.01); *F04D 29/542* (2013.01); *F04D 29/5846* (2013.01); *F05D 2220/32* (2013.01); *F05D 2260/201* (2013.01); *F05D 2260/202* (2013.01); *F05D 2300/175* (2013.01); *F05D 2300/2261* (2013.01); *F05D 2300/2283* (2013.01)

(56) References Cited

U.S. PATENT DOCUMENTS

| | | | |
|---|---|---|---|
| 6,095,755 A | 8/2000 | Houston | |
| 6,238,182 B1 * | 5/2001 | Mayer | F01D 5/189 415/115 |
| 6,543,996 B2 * | 4/2003 | Koschier | F01D 5/186 415/200 |
| 6,742,991 B2 * | 6/2004 | Soechting | F01D 5/186 416/96 A |
| 7,452,182 B2 * | 11/2008 | Vance | F01D 5/14 415/135 |
| 7,789,625 B2 * | 9/2010 | Liang | F01D 5/186 415/115 |
| 7,837,438 B2 | 11/2010 | Campbell | |
| 7,887,300 B2 * | 2/2011 | Mazzola | F01D 5/147 416/224 |
| 7,967,570 B2 * | 6/2011 | Shi | F01D 5/147 29/889.2 |
| 8,016,564 B1 | 9/2011 | Liang | |
| 8,096,766 B1 * | 1/2012 | Downs | F01D 5/147 416/96 A |
| 8,851,421 B2 * | 10/2014 | Jevons | F01D 5/282 244/123.1 |
| 9,011,087 B2 * | 4/2015 | Mironets | F01D 5/147 415/200 |
| 9,133,717 B2 * | 9/2015 | Nakamata | F01D 5/186 |
| 9,835,033 B2 * | 12/2017 | Mironets | F01D 5/147 |
| 2003/0207155 A1 | 11/2003 | Morrison et al. | |
| 2006/0226290 A1 | 10/2006 | Campbell | |
| 2009/0028697 A1 | 1/2009 | Shi et al. | |
| 2009/0208752 A1 | 8/2009 | Shi | |
| 2012/0163978 A1 * | 6/2012 | Darkins, Jr. | F01D 5/147 416/179 |
| 2012/0171039 A1 * | 7/2012 | Huang | F01D 5/282 416/219 R |
| 2012/0269647 A1 | 10/2012 | Vitt et al. | |
| 2013/0108460 A1 | 5/2013 | Szwedowicz et al. | |
| 2013/0251536 A1 * | 9/2013 | Mironets | F01D 5/147 416/229 A |
| 2014/0099476 A1 * | 4/2014 | Subramanian | B22F 5/009 428/164 |
| 2016/0369634 A1 * | 12/2016 | Slavens | F01D 5/28 |

* cited by examiner

AIRFOIL, AND METHOD FOR MANUFACTURING THE SAME

This application claims priority to PCT Patent Appln. No. PCT/US14/45095 filed Jul. 1, 2014, which claims priority benefits under 35 U.S.C. § 119(e) of U.S. Provisional Patent Application No. 61/841,697 filed Jul. 1, 2013, and U.S. Provisional Patent Application No. 61/991,224 filed May 9, 2014, the disclosures of which are herein incorporated by reference.

BACKGROUND

1. Technical Field

Aspects of the present invention relate to a component for use in a gas turbine engine, and more particularly relate to an airfoil for use in a gas turbine engine that includes a first section, a second section, and a functionally graded section extending between the first section and the second section.

2. Background Information

It is known to provide an airfoil for use in a component of a gas turbine engine (e.g., a rotor blade, a guide vane). The airfoil is used to interact with a fluid flow passing within the gas turbine engine to alter one or more characteristics (e.g., direction, pressure, velocity, etc.) of the fluid flow. The airfoil is typically made at least substantially of one or more metal materials. The metal materials typically have a melting point below an internal operating temperature of the gas turbine engine. As such, cooling fluid flows are extracted from the compressor section of the gas turbine engine and are used to cool the airfoil. The airfoil typically includes one or more cavities, channels, and/or apertures through which the cooling fluid flow passes. The configurations of such cavities, channels, and/or apertures have increased in complexity as design engineers have pushed to operate gas turbine engines at ever higher internal operating temperatures.

The airfoil, being made at least substantially of one or more metal materials, typically needs to be manufactured using one or more known casting techniques. The time and cost required to manufacture the airfoil using casting techniques can be high, and can increase as the complexity of the airfoil design increases. Thus, although it may be possible to design an ideal airfoil for a particular application, it might require a complex configuration of one or more cavities, channels, and/or apertures that is prohibitively time consuming and expensive to manufacture.

Recent achievements in material engineering have produced composite materials that are able to withstand significantly higher temperatures than the metal materials that are typically used to make the airfoil. However, the strength and durability of such composite materials is relatively weak as compared to such metal materials, and thus the capabilities of such composite materials has been limited in implementation.

Aspects of the present invention are directed to these and other problems.

SUMMARY OF ASPECTS OF THE INVENTION

According to an aspect of the present invention, a component for use in a gas turbine engine is provided. The component includes a first section, a second section, and a functionally graded section. The first section is made of a metal material. The second section is made of a ceramic material and/or a ceramic matrix composite material. The functionally graded section is disposed between the first section and the second section.

According to another aspect of the present invention, a method for manufacturing a component for use in a gas turbine engine is provided. The component including a first section, a second section, and a functionally graded section disposed between the first section and the second section. The method includes the steps of: (1) forming the first section using a casting technique; (2) forming the functionally graded section on the first section using an additive manufacturing technique; and (3) forming the second section on the functionally graded section using an additive manufacturing technique.

In addition to, or as an alternative to, one or more of the features described above, further aspects of the present invention can include one or more of the following features, individually or in combination:

the functionally graded section is made of a combination of the metal material and the ceramic material;

the functionally graded section includes a gradual variation in composition over a volume of the functionally graded section, and/or a gradual variation in structure over the volume, that results in a corresponding change in a property of the functionally graded section over the volume;

the property is melting point, strength, or durability;

the component includes at least one of a cavity and a channel, through which a cooling fluid flow can pass;

the component includes a plurality of cooling apertures that permit a cooling fluid flow to pass there through to aid in cooling the component; the cooling fluid flow can pass through at least one of the plurality of cooling apertures to minimize thermally-induced stress that might otherwise be caused by differences in respective coefficients of thermal expansion of the first section, the second section, and/or the functionally graded section;

at least one of the plurality of cooling apertures is disposed relative to a portion of the component proximate the functionally graded section;

the first section, the second section, and the functionally graded section have different coefficients of thermal expansion relative to one another;

the component is included in a rotor blade;

the component is included in a guide vane;

the component is positioned at a radially extending distance away from a centerline of the gas turbine engine; the centerline extending in a lengthwise direction between a forward end and an aft end of the gas turbine engine; the component extends radially between a base portion and a tip portion; the component extends in the lengthwise direction between a leading edge and a trailing edge; the component extends circumferentially between a pressure side wall and an opposing suction side wall; and the pressure side wall and the suction side wall connect to form the leading edge and the trailing edge;

a rib extends between the pressure side wall and the suction side wall; a channel wall extends from the rib; an aft cavity is disposed proximate the trailing edge of the component, and is defined between the rib, the pressure side wall, and the suction side wall; a forward cavity is disposed forward of the aft cavity, and is defined between the rib and the channel wall; and a forward channel is disposed proximate the leading edge of the component, and is defined by the rib, the channel wall, the pressure side wall, and the suction side wall;

a plurality of cooling apertures extend through the rib to permit a cooling fluid flow to pass between the aft cavity and the forward channel; and a plurality of cooling apertures that extend through the pressure side wall, and a plurality of cooling apertures that extend through the suction side wall, to permit a cooling fluid flow passing within the forward channel to be discharged from the component.

These and other aspects of the present invention will become apparent in light of the drawings and detailed description provided below.

DETAILED DESCRIPTION OF ASPECTS OF THE INVENTION

Figure 1:
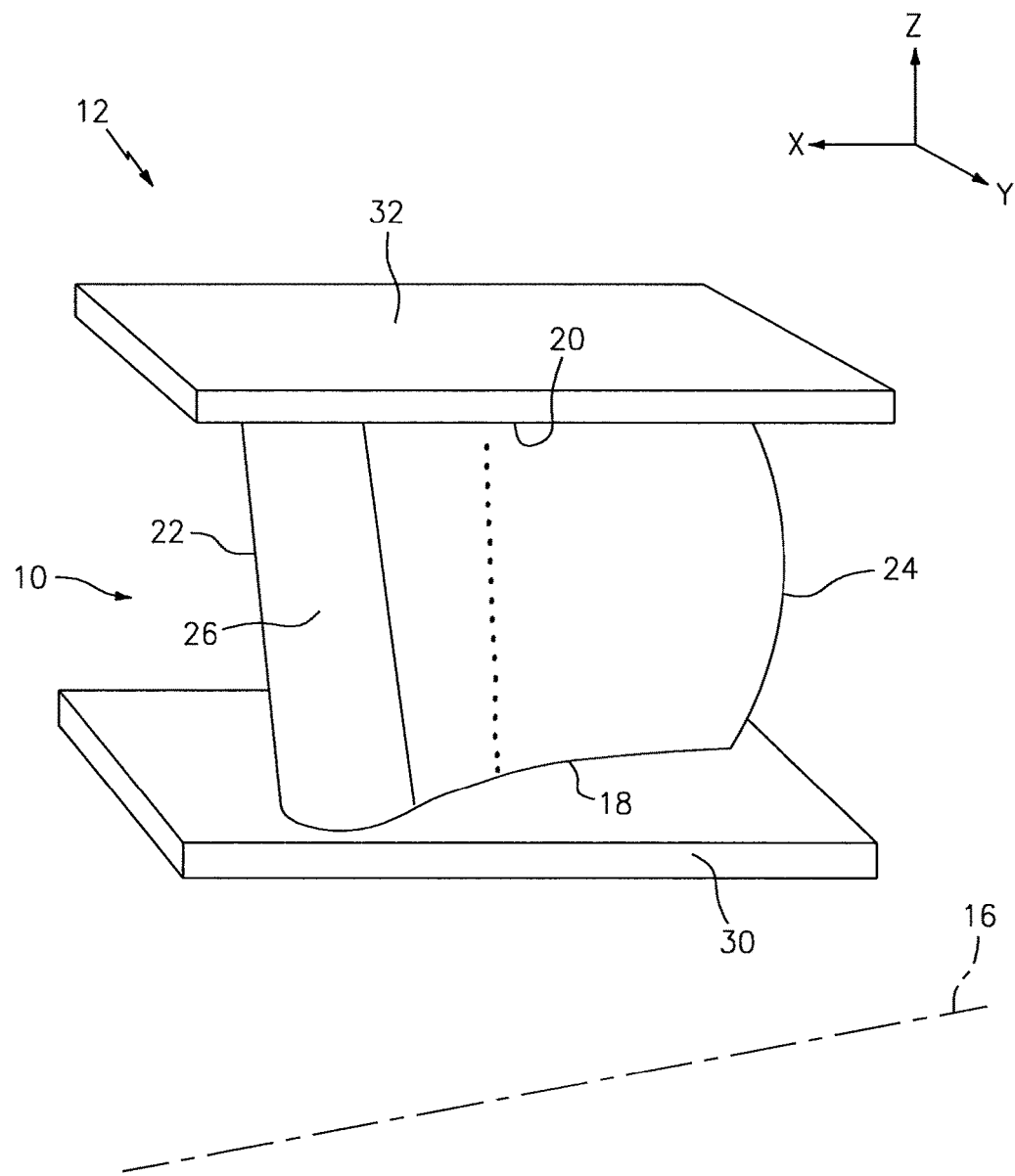
FIG. 1 illustrates a perspective view of a guide vane that includes an embodiment of the present component.

Referring to FIGS. 1-4, the present disclosure describes embodiments of a component 10 (e.g., an airfoil), and embodiments of a method for manufacturing the component 10.

The present disclosure describes aspects of the present invention with reference to the exemplary embodiments illustrated in the drawings; however, aspects of the present invention are not limited to the exemplary embodiments illustrated in the drawings.

The present disclosure may describe one or more features as having a length extending relative to an x-axis, a width extending relative to a y-axis, and/or a height extending relative to a z-axis. The drawings illustrate the respective axes.

The present disclosure uses the terms "circumferential," "annular," and variations thereof, to describe one or more features. The term "circumferential," and variations thereof, are used herein to indicate that a feature extends along a curve that is centered about an axis. The term "annular," and variations thereof, are used herein to indicate that a feature is at least partially in the form of a ring (e.g., a ring in a circular shape or another shape).

The component 10 can be included in various components of a gas turbine engine (not shown). In some embodiments (see FIGS. 1-3), the component 10 (e.g., an airfoil) is included in a guide vane 12. The guide vane 12 can be included in various different sections of the gas turbine engine (e.g., a compressor section, a turbine section). In other embodiments (see FIG. 4), the component 10 (e.g., an airfoil) is included in a rotor blade 14. The rotor blade 14 can be included in various different sections of the gas turbine engine (e.g., a fan section, a compressor section, a turbine section). The component 10 can be included in various types of gas turbine engines (e.g., high-bypass gas turbine engines, low-bypass gas turbine engines, geared turbofan gas turbine engines, non-geared turbofan gas turbine engines, etc.).

Referring to FIGS. 1-4, the component 10 is positioned at a radially extending distance away from a lengthwise-extending centerline 16 (see FIGS. 1, 2 and 4) of the gas turbine engine (not shown). The centerline 16 extends between a forward end and an aft end of the gas turbine engine.

Figure 2:
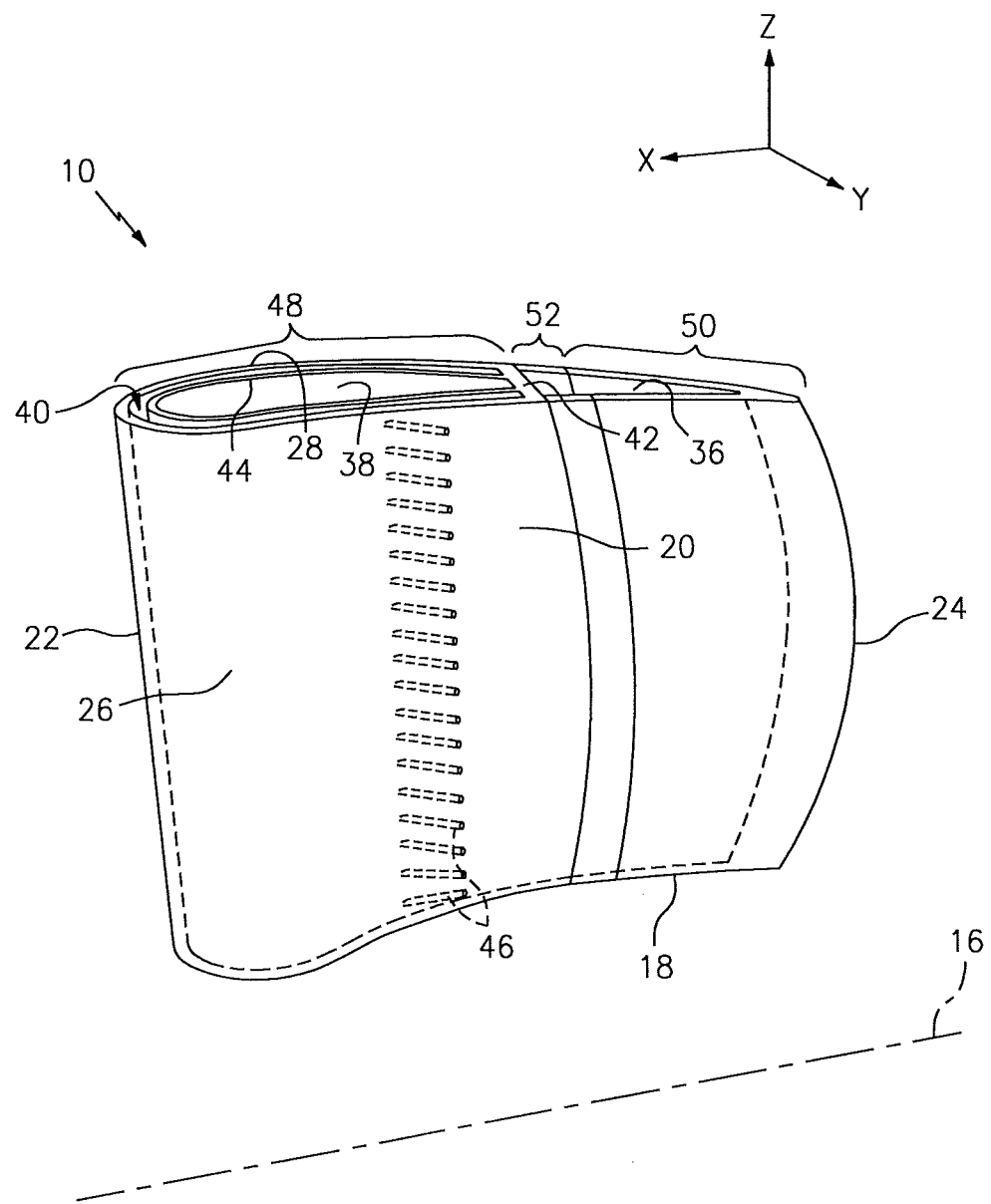
FIG. 2 illustrates a perspective view of the component of FIG. 1.
Figure 3:
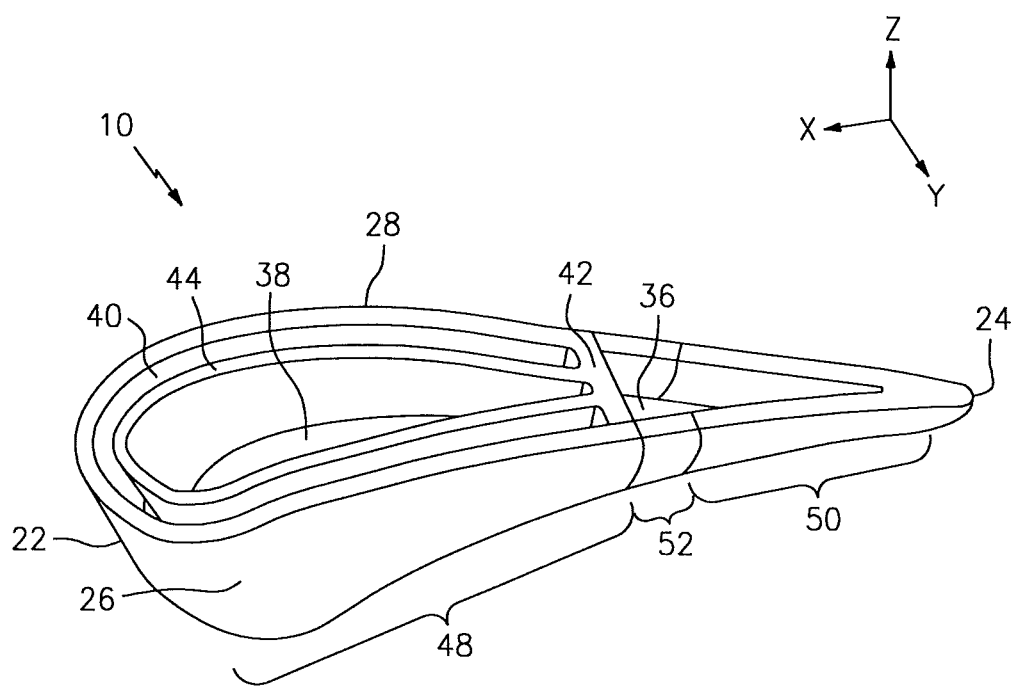
FIG. 3 illustrates a perspective view of the component of FIG. 1
Figure 4:
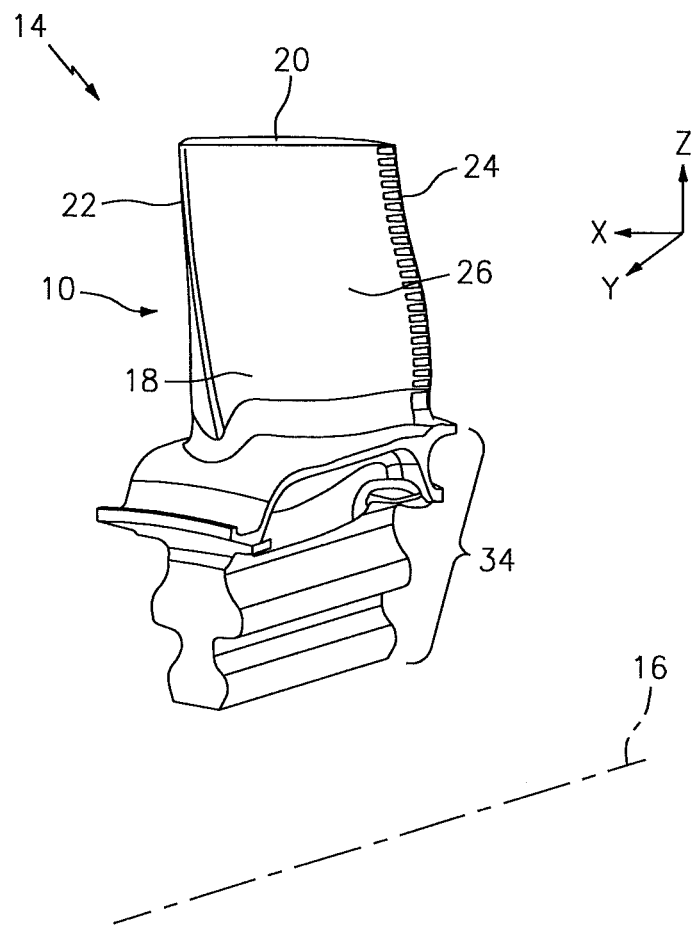
FIG. 4 illustrates a perspective view of a rotor blade that includes an embodiment of the present component.

The component 10 extends radially between a base portion 18 (see FIGS. 1, 2, and 4) and a tip portion 20 (see FIGS. 1, 2, and 4). The component 10 extends in a lengthwise direction between a leading edge 22 and a trailing edge 24. The component 10 extends in a widthwise between a pressure side wall 26 and an opposing suction side wall 28 (see FIGS. 2 and 3). The pressure side wall 26 and the suction side wall 28 connect (e.g., integrally connect) to form the leading edge 22 and the trailing edge 24.

Referring to FIGS. 1-3, in embodiments in which the component 10 is included in a guide vane 12, the base portion 18 of the component 10 can be connected to (e.g., integrally connected to) an inner buttress 30 of the guide vane 12, and the tip portion 20 of the component 10 can be connected to (e.g., integrally connected to) an outer buttress 32 of the guide vane 12. The inner and outer buttresses 30, 32 of the guide vane 12 can be positionally fixed to one or more stationary components of the gas turbine engine. During operation of the gas turbine engine, the component 10 interacts with a fluid flow passing within the gas turbine engine, to alter one or more characteristics (e.g., direction, pressure, velocity, etc.) of the fluid flow.

Referring to FIG. 4, in embodiments in which the component 10 is included in a rotor blade 14, the base portion 18 of the component 10 can be connected to (e.g., integrally connected to) a blade root 34 of the rotor blade 14. The blade root 34 can be positionally fixed relative to an annular disk (not shown) that that extends circumferentially about the centerline 16 of the gas turbine engine. During operation of the gas turbine engine, the disk is rotationally driven, which in turn drives the rotor blade 14 about the centerline 16. The component 10 interacts with a fluid flow passing within the gas turbine engine to alter one or more characteristics (e.g., direction, pressure, velocity, etc.) of the fluid flow.

Referring to FIGS. 2 and 3, the component 10 includes one or more cavities 36, 38, and/or at least one channel 40, through which one or more cooling fluid flows (not shown) can pass. In the illustrated embodiment, the component 10 includes an aft cavity 36, a forward cavity 38, and a forward channel 40. The component 10 further includes a rib 42 and a channel wall 44 that each partially define one or more of the aft cavity 36, the forward cavity 38, and the forward channel 40. The rib 42 extends between the pressure side wall 26 and the suction side wall 28. The channel wall 44 extends from the rib 42. The aft cavity 36 is disposed proximate the trailing edge 24 of the component 10, and is defined between the rib 42, the pressure side wall 26, and the suction side wall 28. The forward cavity 38 is disposed forward of the aft cavity 36, and is defined between the rib 42 and the channel wall 44. The forward channel 40 is disposed proximate the leading edge 22 of the component 10, and is defined by the rib 42, the channel wall 44, the pressure side wall 26, and the suction side wall 28.

The one or more cavities 36, 38 and/or the at least one channel 40 can be configured in various ways other than as shown in FIGS. 2 and 3. The configuration of the one or more cavities 36, 38 and/or the at least one channel 40 can be chosen to achieve one or more predetermined characteristics of the component 10 (e.g., structural support capability, torsional stiffness, bending stiffness).

The component 10 includes a plurality of cooling apertures (e.g., holes, slots) that permit a cooling fluid flow to pass there through to aid in cooling (e.g., via impingement cooling, film cooling, convention cooling, etc.) one or more portions of the component 10. Referring to FIGS. 2 and 3, in illustrated embodiment the component 10 includes a plurality of cooling apertures (not shown) that extend through the rib 42 to permit a cooling fluid flow to pass between the aft cavity 36 and the forward channel 40. The cooling apertures are positioned along the height of the rib 42. The component 10 also includes a plurality of cooling apertures 46 (see FIG. 2) that extend through the pressure side wall 26, and a plurality of cooling apertures (not shown) that extend through the suction side wall 28, to permit a cooling fluid flow to pass from the forward channel 40 to the environment surrounding the component 10 (i.e., to permit the cooling fluid flow passing within the forward channel 40 to be discharged from the component 10).

The component 10 includes at least three discrete sections: a first section 48; a second section 50; and a functionally graded section 52 disposed between the first section 48 and the second section 50.

The first section 48 is made at least substantially of one or more metal materials, including, for example, one or more nickel-based superalloys (e.g., Mar-M-247™, INCO 738™ or CMSX-4®), and/or one or more cobalt-based superalloys (e.g., Mar-M-509™, CoCr).

The second section 50 is made of one or more ceramic materials (e.g., SiC, Si3N4, SiOxNy, Al2O3, and/or another ceramic material known in the art) and/or one or more ceramic matrix composite materials (e.g., Si3N4, SiC, C/SiC, SiC/SiC, SiC/C, and another ceramic matrix composite material known in the art).

The functionally graded section 52 is made of a combination of the materials included in the first section 48 and the materials included in the second section 50. The phrase "functionally graded," and variations thereof, are used herein to indicate that the functionally graded section 52 includes a gradual variation in composition and/or structure over its volume. The gradual variation in composition and/or structure results in corresponding changes in one or more properties (e.g., melting point, strength, durability) of the functionally graded section 52 over its volume.

The first section 48, the second section 50, and the functionally graded section 52 can form various different portions of the component 10. However, the second section 50 and the functionally graded section 52 form respective portions of the component 10 that do not include the above-described cooling apertures (i.e., the second section 50 and the functionally graded section 52 are free of cooling apertures). This is because it can be relatively difficult to form the above-described cooling apertures in portions of the component 10 (e.g., the second section 50 and the functionally graded section 52) that are made at least partially of one or more composite materials.

One or more of the above-described cooling apertures are disposed relative to a portion of the component 10 that is proximate to the functionally graded section 52 of the component 10. The cooling fluid flow passing through those cooling apertures serves to minimize effects that might otherwise be caused by differences in the coefficient of thermal expansion of the various sections of the component 10, as will be described further below. Referring to FIGS. 2 and 3, in the illustrated embodiment the cooling fluid flow that passes through the cooling apertures (not shown) in the rib 42 serves this function, at least in part because the rib 42 is disposed immediately forward of the functionally graded section 52, as will be described further below.

Referring to FIGS. 2 and 3, in the illustrated embodiment the first section 48 of the component 10 forms a forward portion of the pressure side wall 26, a forward portion of the suction side wall 28, the channel wall 44, and the rib 42. The second section 50 forms an aft portion of the pressure side wall 26, and an aft portion of the suction side wall 28. The functionally graded section 52 forms an intermediate portion of the pressure side wall 26, and an intermediate portion of the suction side wall 28. The intermediate portion of the pressure side wall 26 extends between the forward and aft portions of the pressure side wall 26, and the intermediate portion of the suction side wall 28 extends between the forward and aft portions of the pressure side wall 26. The respective intermediate portions of the pressure side wall 26 and the suction side wall 28 are disposed immediately aft of the rib 42.

Referring to FIGS. 2 and 3, although the illustrated embodiment is configured such that the second section 50 forms the trailing edge 24 of the component 10, in other embodiments not shown in the drawings, the second section 50 can additionally or alternatively form the leading edge 22 of the component 10. For example, in an embodiment (not shown) similar to the one shown in FIGS. 2 and 3, the second section 50 of the component 10 forms the respective forward portions of the pressure side wall 26 and the suction side wall 28 (and thus forms the leading edge 22 of the component 10); and the first section 48 forms the respective aft portions of the pressure side wall 26 and the suction side wall 28. In another embodiment (not shown) similar to the one shown in FIGS. 2 and 3, the component 10 includes, in a superimposed relationship, a first second section 50, a first functionally graded section 52, a first section 48, a second functionally graded section 52, and a second second section 50. The first second section 50 forms the respective forward portions of the pressure side wall 26 and the suction side wall 28 (and thus form the leading edge 22 of the component 10), and the second second section 50 forms the respective aft portions of the pressure side wall 26 and the suction side wall 28 (and thus forms the trailing edge 24 of the component 10).

During operation of the component 10 in the illustrated embodiments, a cooling fluid flow (not shown) is fed into the aft cavity 36 (e.g., via one or more flow apertures disposed in the base portion 18 or the tip portion 20 of the component 10). The cooling fluid flow passes in a radial direction through the aft cavity 36 to provide relatively low amounts of convective cooling to the respective aft portions of the pressure side wall 26 and the suction side wall 28. The cooling fluid flow thereby minimizes effects (e.g., thermally-induced stress) that might otherwise be caused by differences in the coefficient of thermal expansion of the various sections of the component 10. The cooling fluid flow then passes into the forward channel 40 via the above-described cooling apertures (not shown) that extend through the rib 42. As the cooling fluid flow passes through those cooling apertures, the cooling fluid flow provides relatively high amounts of convective cooling to the rib 42, as well as other portions of the component 10 disposed proximate the functionally graded section 52 (e.g., the respective intermediate portions of the pressure side wall 26 and the suction side wall 28). Further, as the cooling fluid flow passes through the cooling apertures disposed in the rib 42, the cooling fluid flow further aids in minimizing effects (e.g., thermally-induced stress) that might otherwise be caused by differences in the coefficient of thermal expansion of the various sections of the component 10. The cooling fluid flow disposed within the forward channel 40 is ultimately discharged from the component 10 via the respective cooling apertures that extend through the pressure side wall 26 (see FIG. 2, elements 46) and the suction side wall (not shown).

A method for manufacturing the component 10 includes the steps of: (1) forming the first section 48; (2) forming the functionally graded section 52 on the first section 48; and (3) forming the second section 50 on the functionally graded section 52.

The step of forming the first section 48 can be performed using one or more casting techniques that are known in the art. Additionally or alternative, the step of forming the first section 48 can be performed using one or more of the manufacturing techniques disclosed in U.S. Provisional Patent Application No. 61/841,697 (e.g., solid freeform fabrication (SSF), powder-based layer by layer additive SFF manufacturing, selective laser sintering (SLS), direct laser sintering (DLS), selective laser melting (SLM), direct laser melting (DLM), etc.).

The step of forming the functionally graded section 52 on the first section 48, and the step of forming the second section 50 on the functionally graded section 52, can be performed using one or more additive manufacturing techniques (e.g., one or more of the additive manufacturing techniques disclosed in U.S. Provisional Patent Application No. 61/841,697).

The present component 10, and the present method for manufacturing the component 10, offer several significant advantages.

First, the portions of the component 10 that are formed by the second section 50 have higher melting points than they might otherwise have if they were made at least substantially of one or more metal materials. As such, the need to include cooling apertures in those portions of the component 10 can be eliminated.

Second, the component 10 can be configured such that the second section 50 forms those portions of the component 10 that experience the highest temperatures during operation. In many instances, the trailing edge 24, and portions proximate the trailing edge 24, experience the highest temperatures during operation. As such, in the illustrated embodiments, the component 10 is configured such that the second section 50 forms the trailing edge 24 of the component 10.

Third, the portions of the component 10 that are formed by the second section 50 are lighter weight than they might otherwise be if they were made at least substantially of one or more metal materials. As such, the overall weight of the component 10 can be reduced by including the second section 50.

Fourth, the functionally graded section 52 of the component 10 aids in minimizing effects (e.g., thermally-induced stress) that might otherwise be caused by differences in the coefficient of thermal expansion of the various sections of the component 10. As a result, the functionally graded section 52 provides an integral connection between the first section 48 and the second section 50 that experiences significantly lower stresses during operation of the gas turbine engine than would be experienced by a direct connection between the first section 48 and the second section 50.

Fifth, the inclusion of one or more cooling apertures relative to a portion of the component 10 that is proximate to the functionally graded section 52 further aids in minimizing effects (e.g., thermally-induced stress) that might otherwise be caused by differences in the coefficient of thermal expansion of the various sections of the component 10.

Sixth, the component 10 can be easier to manufacture than other components that exclude a second section and are made at least substantially of one or more metal materials. The sections of an component that are made at least substantially of one or more metal materials typically need to be manufactured using one or more known casting techniques, which can be very time consuming and expensive. In the present component 10, the inclusion of the second section 50 and the functionally graded section 52 (which are manufactured using additive manufacturing techniques) significantly reduces the size and complexity of the section of the component 10 (i.e., the first section 48) that needs to be manufactured using one or more known casting techniques. The additive manufacturing techniques used to manufacture the second section 50 and the functionally graded section 52 can be significantly faster and cheaper than the casting techniques used to manufacture the first section 48 of the component 10.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A component for use in a gas turbine engine, comprising:
    an airfoil configured with a pressure side wall, a suction side wall, a rib and an aft cavity;
    the pressure side wall and the suction side wall extending longitudinally between and connected at a leading edge and a trailing edge;
    the rib extending laterally between the pressure side wall and the suction side wall;
    the aft cavity extending laterally between the pressure side wall and the suction side wall, and the aft cavity extending longitudinally from the rib to the pressure side wall and the suction side wall at the trailing edge;
    the airfoil comprising a first section consisting of a metal material, a second section consisting of a ceramic matrix composite material and a functionally graded section;
    the first section forming the rib and a portion of the pressure side wall extending from the rib to the leading edge;
    the second section forming a portion of the pressure side wall extending from the functionally graded section to the trailing edge; and
    the functionally graded section forming a portion of the pressure side wall extending from the first section to the second section.

2. The component of claim 1, wherein the functionally graded section is made of a combination of the metal material and the ceramic matrix composite material.

3. The component of claim 1, wherein the metal material comprises a nickel-based superalloy.

4. The component of claim 1, wherein the metal material comprises a cobalt-based superalloy.

5. The component of claim 1, wherein the ceramic material comprises at least one of SiC, $Si_3N_4$, SiOxNy and $Al_2O_3$.

6. The component of claim 1, wherein the ceramic material comprises at least one of C/SiC, SiC/SiC and SiC/C.

7. The component of claim 1, wherein the functionally graded section includes at least one of a gradual variation in composition over a volume of the functionally graded section, or a gradual variation in structure over the volume, that results in a corresponding change in a property of the functionally graded section over the volume.

8. The component of claim 7, wherein the property is melting point, strength or durability.

9. The component of claim 1, wherein the component includes at least one of a forward cavity and a channel, through which a cooling fluid flow is operable to pass.

10. The component of claim 1, wherein
the component is configured with a plurality of cooling apertures that permit a cooling fluid flow to pass there through to aid in cooling the component; and
the cooling fluid flow is operable to pass through at least one of the plurality of cooling apertures to minimize thermally-induced stress caused by differences in respective coefficients of thermal expansion of at least two of the first section, the second section and the functionally graded section.

11. The component of claim 10, wherein at least one of the plurality of cooling apertures is disposed within a portion of the component in the first section proximate the functionally graded section.

12. The component of claim 1, wherein the first section, the second section and the functionally graded section have different coefficients of thermal expansion relative to one another.

13. The component of claim 1, wherein the component is included in a rotor blade.

14. The component of claim 1, wherein the component is included in a guide vane.

15. The component of claim 1, wherein
the airfoil is further configured with a channel wall, a forward cavity and a forward channel;
the channel wall extends from the rib;
the forward cavity is disposed forward of the aft cavity, and the forward cavity is defined between and by the rib and the channel wall; and
the forward channel is disposed proximate the leading edge of the component, and the forward channel is defined by the rib, the channel wall, the pressure side wall and the suction side wall.

16. The component of claim 15, wherein the first section further forms the channel wall.

17. The component of claim 15, wherein a plurality of cooling apertures extend through the rib to permit a cooling fluid flow to pass between the aft cavity and the forward channel.

18. The component of claim 15, wherein a plurality of cooling apertures extend through the pressure side wall, and a plurality of cooling apertures extend through the suction side wall, to permit a cooling fluid flow passing within the forward channel to be discharged from the component.

19. The component of claim 1, wherein
the first section further forms a portion of the suction side wall extending from the rib to the leading edge;
the second section further forms a portion of the suction side wall extending from the functionally graded section to the trailing edge; and
the functionally graded section further forms a portion of the suction side wall extending from the first section to the second section.

20. The component of claim 1, wherein the portion of the pressure side wall formed by the functionally graded section extends from the rib to the second section.

21. A component for use in a gas turbine engine, comprising:
an airfoil configured with a pressure side wall, a suction side wall, a rib and an aft cavity;
the pressure side wall and the suction side wall extending longitudinally between and connected at a leading edge and a trailing edge;
the rib extending laterally between the pressure side wall and the suction side wall;
the aft cavity extending laterally between the pressure side wall and the suction side wall, and the aft cavity extending longitudinally from the rib to the pressure side wall and the suction side wall at the trailing edge;
the airfoil comprising a first section of a metal material, a second section of a ceramic matrix composite material and a functionally graded section;
the first section forming the rib and a portion of the suction side wall extending from the rib to the leading edge;
the second section forming a portion of the suction side wall extending from the functionally graded section to the trailing edge; and
the functionally graded section forming a portion of the suction side wall extending from the first section to the second section.

22. The component of claim 21, wherein
the first section further forms a portion of the pressure side wall extending from the rib to the leading edge;
the second section further forms a portion of the pressure side wall extending from the functionally graded section to the trailing edge; and
the functionally graded section further forms a portion of the pressure side wall extending from the first section to the second section.

23. The component of claim 21, wherein the portion of the suction side wall formed by the functionally graded section extends from the rib to the second section.

24. The component of claim 21, wherein
the airfoil is further configured with a channel wall, a forward cavity and a forward channel;
the channel wall is formed by the first section and projects out from the rib;
the forward cavity is disposed forward of the aft cavity, and the forward cavity is defined between the rib and the channel wall; and
the forward channel is disposed proximate the leading edge of the component, and the forward channel is defined by the rib, the channel wall, the pressure side wall and the suction side wall.

25. The component of claim 21, wherein
the first section consists of the metal material; and
the second section consists of the ceramic matrix composite material.

* * * * *